(12) United States Patent
Morris et al.

(10) Patent No.: US 7,266,563 B2
(45) Date of Patent: Sep. 4, 2007

(54) SPECIFYING, ASSIGNING, AND MAINTAINING USER DEFINED METADATA IN A NETWORK-BASED PHOTOSHARING SYSTEM

(75) Inventors: Robert Paul Morris, Raleigh, NC (US); Hugh Svendsen, Apex, NC (US); Patty Scardino, Apex, NC (US)

(73) Assignee: FotoMedia Technologies, LLC, Portsmouth, NH (US)

( * ) Notice: Subject to any disclaimer, the term of this patent is extended or adjusted under 35 U.S.C. 154(b) by 292 days.

(21) Appl. No.: 10/034,277

(22) Filed: Dec. 28, 2001

(65) Prior Publication Data

US 2003/0126212 A1    Jul. 3, 2003

(51) Int. Cl.
*G06F 17/30* (2006.01)
(52) U.S. Cl. .................... 707/102; 707/101; 707/104.1
(58) Field of Classification Search .................... 707/3, 707/10, 9, 101, 102, 104.1; 709/203, 219
See application file for complete search history.

(56) References Cited

U.S. PATENT DOCUMENTS

| | | | |
|---|---|---|---|
| 5,812,134 A * | 9/1998 | Pooser et al. ................ 715/848 |
| 6,363,392 B1 * | 3/2002 | Halstead et al. ............. 707/102 |
| 6,434,579 B1 * | 8/2002 | Shaffer et al. .............. 715/520 |
| 6,502,102 B1 * | 12/2002 | Haswell et al. .............. 707/102 |
| 6,535,868 B1 * | 3/2003 | Galeazzi et al. ................ 707/2 |
| 6,629,100 B2 * | 9/2003 | Morris et al. .................. 707/10 |
| 6,629,104 B1 * | 9/2003 | Parulski et al. ............. 707/102 |
| 6,708,186 B1 * | 3/2004 | Claborn et al. ............. 707/102 |
| 6,721,747 B2 * | 4/2004 | Lipkin .......................... 707/10 |
| 6,757,684 B2 * | 6/2004 | Svendsen et al. ............. 707/10 |
| 2002/0069192 A1 * | 6/2002 | Aegerter ........................ 707/1 |
| 2003/0014397 A1 * | 1/2003 | Chau et al. ..................... 707/3 |
| 2003/0018607 A1 * | 1/2003 | Lennon et al. ................. 707/1 |
| 2003/0065663 A1 * | 4/2003 | Chu ............................ 707/10 |

OTHER PUBLICATIONS

OpenLDA Software 2.3 Administrator's guide: Schema specification, pp. 2-8, Jun. 2003.*
Creating custom properties for files and folders, pp. 1-5, May 1999.*
An Idiot's Guide to the Resource Description Framework., Renato Lannella, Dec. 2001.*
Iannella, Renato, "An Idiot's Guide to the Resource Description Framework," The New Review of Information Networking, vol. 4, Sep. 3, 1998, pp. 1-10.

* cited by examiner

*Primary Examiner*—Jean M. Corrielus

(57) ABSTRACT

A method and system for allowing a user to define and use custom metadata is disclosed. The method and system include providing a network accessible server with a metadata library having plurality of metadata vocabularies. The server allows the user to create a custom metadata vocabulary by displaying a user interface on a client computer in which the user specifies a plurality of properties defining the custom metadata vocabulary. When the custom metadata vocabulary is defined, it is stored in the metadata library for subsequent access. The method and system further allow the user to search the metadata library to select at least one of the metadata vocabularies to apply to an electronic resource.

36 Claims, 5 Drawing Sheets

Manage Vocabulary Library

Create a Vocabulary

Assign Required Metadata

Assign Metadata

SPECIFYING, ASSIGNING, AND MAINTAINING USER DEFINED METADATA IN A NETWORK-BASED PHOTOSHARING SYSTEM

FIELD OF THE INVENTION

The present invention relates to electronic storage and sharing of files and other web resources, and more particularly to a method and system for specifying, assigning, and maintaining user defined metadata in a network-based photosharing system.

BACKGROUND OF THE INVENTION

Metadata has been associated with digital images, and is typically supported by online photosharing sites. However, digital image metadata has shared the same restrictions as metadata in general. It has been limited to standard metadata as defined by the various versions of the Exif standard. This metadata is of limited use to most users of digital images. Some cameras produce proprietary metadata, however, specialized PC software is required to parse, interpret, and store the image metadata. Some photo hosting sites support the specification of a limited amount of metadata. This metadata is restricted in that users cannot define new metadata fields or are limited to a fixed number of "user defined" fields. The ability to provide optional "user defined" metadata may be provided, but is limited because metadata support usually does not extend much beyond that defined by the Exif image file format standard. In addition, the methods the photoshosting sites use to store and transmit the metadata is propriety, making its use beyond that of the photohosting site limited. Further, searches are usually limited to only a subset of the limited metadata that is supported by a site.

It is expected that camera manufacturers and photohosting sites will soon begin storing the metadata they support in XML or RDF (Resource Description Framework) format. This will go along way towards making this metadata useful to a large range of applications. RDF, developed by the World-Wide Web Consortium (W3C), provides a schema language for defining metadata vocabularies that allows interoperability between applications that exchange metadata. RDF allows descriptions of Web resources, which is any object with a uniform resource identifier (URI) as its address, to be made available in machine readable form. RDF is an application of XML and extends the XML model and syntax to be specific for describing resources. A resource is can be anything which can be uniquely identified. That is anything which can be assigned a URI. RDF supports a class system where a class specifies a set of properties and constraints on the possible values of those properties. These classes are specified using a schemal language, such as RDF Schema. A collection of property values associated with one or more of these classes is called an RDF description. Each of these properties has a property type and value specified in the associated schema. Schemas are identified uniquely by assigning each a URI. RDF utilizes the namespace facility of XML to point to a URI. Thus, the schema can be accessed at the URI identified by the namespace.

Even though RDF enables metadata to be understandable to many applications and enables metadata to be infinitely extendable, the use of metadata by photosharing sites would still be problematic. The primary problem is that a user wishing to use these capabilities must understand the technical details of RDF to define his/her metadata.

One problem with RDF, however, is that the syntax is complicated to learn, especially for a non-computer user. For instance, the following is a portion of the RDF syntax for describing a report:

```
<Description about = "http://flashpoint.com./report.html">
    <DC:Title> Specifying and Assigning Metadata </DC:Title>
    <DC:Creator> Paul Morris </DC:Creator>
    <DC:Date> 2001-01-01 </DC:Date>
    <DC:Subject> Metadata, RDF </DC:Subject>
</Description>
</RDF>
```

Thus, users will not be able to specify metadata to suit his/her own particular needs without becoming an expert in RDF and XML. Further, even if the user took the time to learn RDF and XML, there is currently no mechanism to support for the storage, display, management, or use of this "user defined" metadata.

Accordingly, what is needed is a system that allows a user to specify metadata for digital files that suits the user's own particular needs, provides storage/retrieval for this metadata, and integrates this metadata into its service, such as image presentation, searching, and grouping. Further, the system must enable this without requiring the user to understand the underlying technologies associated with the metadata schema and specification languages. The present invention addresses such needs.

SUMMARY

The present invention provides a method and system for allowing a user to define and use custom metadata. The method and system include providing a network accessible server with a metadata library comprising a plurality of metadata vocabularies. The server allows the user to create a custom metadata vocabulary by displaying a user interface on a client computer in which the user specifies a plurality of properties defining the custom metadata vocabulary. When the custom metadata vocabulary is defined, it is stored in the metadata library for subsequent access. The method and system further allow the user to search the metadata library to select at least one of the metadata vocabularies to apply to an electronic file or other target resource.

According to the method and system disclosed herein, an online library of metadata vocabularies is provided from which users may create custom vocabularies using a form-driven interface without needing to understand the underlying semantics and syntax of the schema language.

DETAILED DESCRIPTION OF THE INVENTION

The present invention relates to a method and system for specifying, assigning, and maintaining user-defined metadata in a network-based metadata management system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides a metadata management system that allows users of to specify custom metadata, assign the custom metadata to images, and manage the metadata. The present invention provides an online library of metadata vocabularies from which users may create custom vocabularies using a form-driven interface without needing to understand the underlying semantics and syntax of the schema language. In a preferred embodiment the vocabularies are specified using the RDF schema definition language specified by the W3C. (See www.w3.org/RDF/ for details of RDF and RDF schema languages.) Although RDF is expected to become the standard for specification and exchange of metadata on the web, any schema language with similar capabilities will work with this system.

Figure 1:
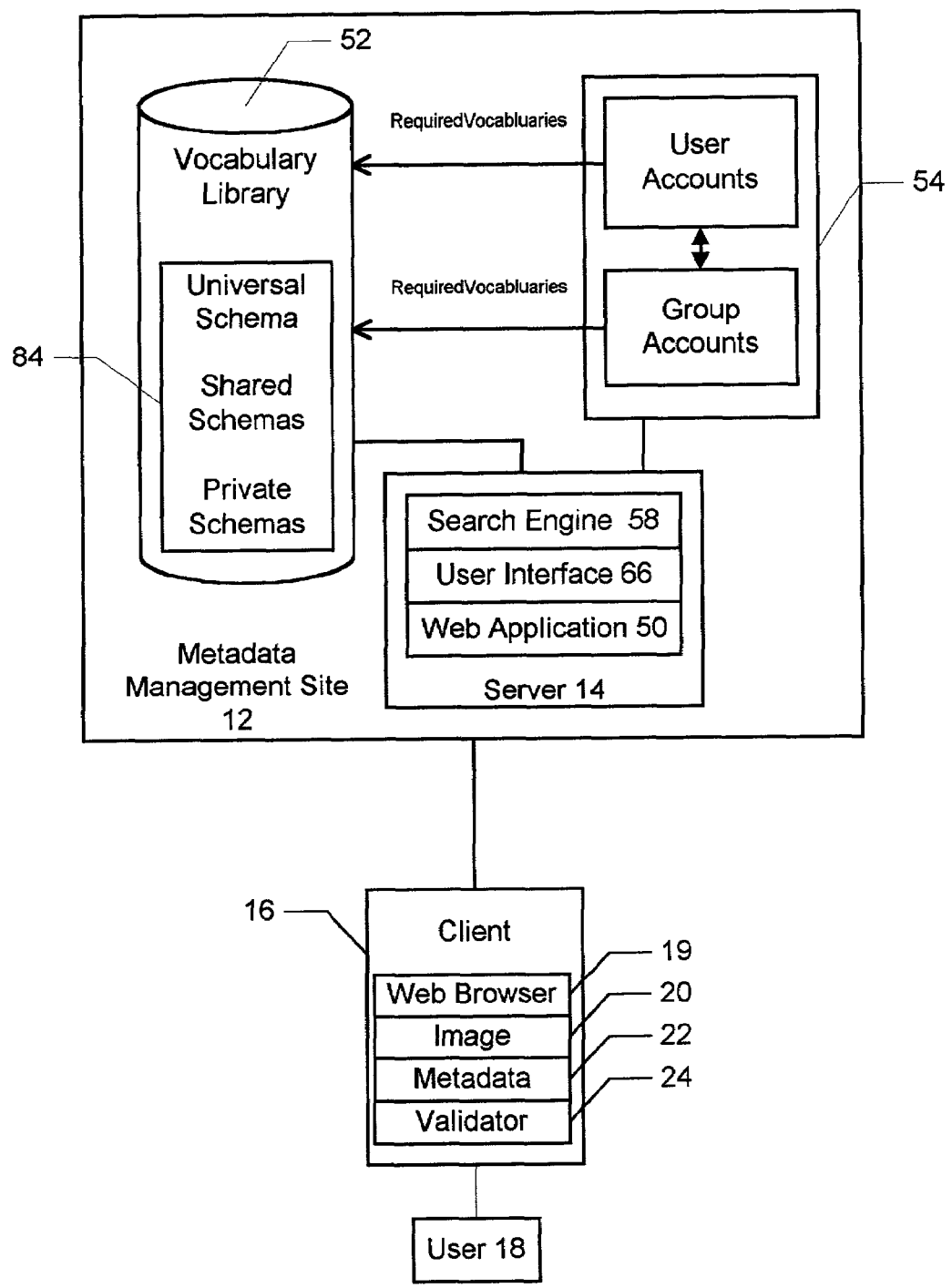
FIG. 1 is a block diagram illustrating an online metadata management system in accordance with a preferred embodiment of the present invention.

FIG. 1 is a block diagram illustrating an online metadata management system in accordance with a preferred embodiment of the present invention. According to the present invention, the system 10 includes a metadata management website 12 that includes a server 14, and multiple client computers 16. In a preferred embodiment, the server 14 can be accessed at a specific uniform resource locator (URL) address on the Internet or other network, and users 18 interact with the photosharing site 12 through a standard Web browser 19.

In a preferred embodiment, the metadata management system 10 is used in conjunction with a photosharing site and client computers 16 typically store the digital images 20 of a particular user 18. The digital images 20 are stored as image files that include image data. Each image also has metadata 22 associated with it that describe and categorize the image. The metadata 22 may be associated with the images 20 by the user 18 or automatically by the server 14 as described below.

According to the present invention, the metadata management site 12 allows users 18 to create, manage, and reuse metadata vocabularies and schema languages without requiring that the users 18 know the details of the metadata schema or exchange syntax. The present invention will be described in terms of a preferred embodiment where the targets to which the metadata is applied are digital images 20, although the metadata 22 may be applied to any type of digital resource.

The user 18 may upload the images 20 and the associated metadata 22 to the server 14 for storage. In the alternative embodiment of the present invention, the client computers 16 maintain storage of the actual image data and only the metadata 22 for each image are uploaded to the server 14.

In operation, users 18 of the client computers 16 register themselves with the server 14 to become members of the service so that they can specify, assign, and manage custom metadata. Once a member of the service, users 18 can search the server 14 for and reuse custom metadata defined by other users 18.

In a preferred embodiment, the server 14 includes a web server application 50, a metadata vocabulary library 52, and a user and group account database 54. The metadata vocabulary library 52 is for storage and management of metadata schemas 84 or vocabularies. The vocabulary library 52 stores both custom metadata vocabularies 84 created by the users 18, as well as actual metadata values associated with specific images 22 and uploaded from client computers 16.

In a preferred embodiment, the vocabulary library 52 includes a universal schema, shared schemas, and private schemas, which in a preferred embodiment are defined using RDF and XML. All images 20 in the system 10 are required to have associated with them metadata 22 specified by the universal schema. Each schema or vocabulary 84 specifies the metadata properties in that vocabulary and specifies constraints that must be enforced in order to comply with the vocabulary. The present invention allows users 18 and groups to define their own schemas, which may include the universal schema and may borrow from other vocabularies 84.

According to the present invention, the web server application 50 includes a form-driven user interface 66 that provides users 18 with an easy and intuitive way to define custom metadata vocabularies 84 without specifying the syntax for knowing the underlying schema language.

For example, the homepage for the photosharing site 12 may display a web page having the following links: "Create A New Metadata Vocabulary" and "Search For A Metadata Vocabulary." If the user clicks on the link to "Create New Metadata Vocabulary", then one or more web pages may be displayed with a field for entering the title of the new metadata vocabulary, multiple fields for entering properties for the vocabulary, and fields for entering constraints on the values for each property.

Assume, for example, that the same a user has taken photos of national parks and wishes to use the photosharing site 12 to create a custom metadata vocabulary for "national parks". Possible properties the user could define for this new metadata vocabulary include the name of the park, its location (i.e. state and country), the names of objects in the picture, the category (e.g., wildlife, landscape, structure, etc). A possible constraint is that the country must be chosen from a list specified in the vocabulary schema, and the state must be chosen from a list which depends on the value of the country.

It should be noted that the RDF schema language is not as complete as it could be with respect to specifying constraints. There are good reasons for this as identified by the W3C (see the RDF working group home page). Therefore, according a further aspect of the present invention, the user 18 is provided with the option of associating a vocabulary validator 24 with a newly defined metadata vocabulary 84 in the case were stronger constraints are needed. According to the present invention, the vocabulary validator 24 is a software program that runs on either the server or the client computers 16 that uses a plugin interface provided by the Web application 50. For example, the plugin interface could define an interface compatible with Java's Enterprise java beans, or use a remote method invocation technology such as RMI or IIOP which makes the location of the validator unknown to the web application invoking it. The Web application 50 passes the metadata corresponding to the custom metadata vocabulary to the vocabulary validator 24 after it has ensured the constraints specified using the RDF schema have been enforced for further constrain enforcement. This process is described in more detail later.

The Web application 50 provides metadata library management support that allows users with the appropriate permissions to not only add new metadata vocabularies 84 to the library 52, but also to enter search terms in the user interface 66 to find existing metadata vocabularies 84 and properties. The user 18 may then add one or more existing metadata vocabularies 84 to the user's custom metadata vocabulary, or only select particular properties from the existing metadata vocabularies 84 to add to the user's custom metadata vocabulary. When user has completed the task of entering and/or selecting properties and constraints for the custom metadata vocabulary 84, the newly created metadata vocabulary is stored in the metadata vocabulary library 52.

The user account database 54 stores user account and corresponding contact information and preferences of each registered user 18. According to the present invention, groups and users may specify their own metadata 22 vocabularies and may share these vocabularies with other users and groups. Users and group administrators may specify one or more vocabularies, which must be supported for images associated with the user and group accounts, respectively. The server 14 and client computers 16 enforce these metadata requirements. Groups of users 18 may also share common policies, which may include permission settings, user interface options, required and optional metadata vocabularies 84, subscriptions lists, and event/notification policies. In a preferred embodiment access control lists are maintained to control and restrict access. In alternate embodiment, role based permissions as supported by the Java Authentication and Activation Services may be supported.

The user account database 54 allows mandatory vocabularies 84 to be associated with certain target resources. For example, a particular user 18 may want all of his individual photographs to have a certain set of metadata always supplied. His/her account would be configured to indicate the assignment of metadata supporting the relevant metadata vocabulary 84 is required before the image 20 may be stored on the system 10. An example of required metadata, might be a vocabulary 84 for data about the owner of the account (e.g name, address, etc). Multiple vocabularies 84 may be required for any given target types.

Digital still Images 20 need not be the only type of target resources. Examples of other types of image files for which required vocabularies may be specified include multiple image files, such as timelapse images, burst images, panarama images, etc. Non-image target resources may also be supported, such as sound files, movies, and text documents. The present invention applies to any resource that could conceivably have metadata associated with it.

Figure 2:
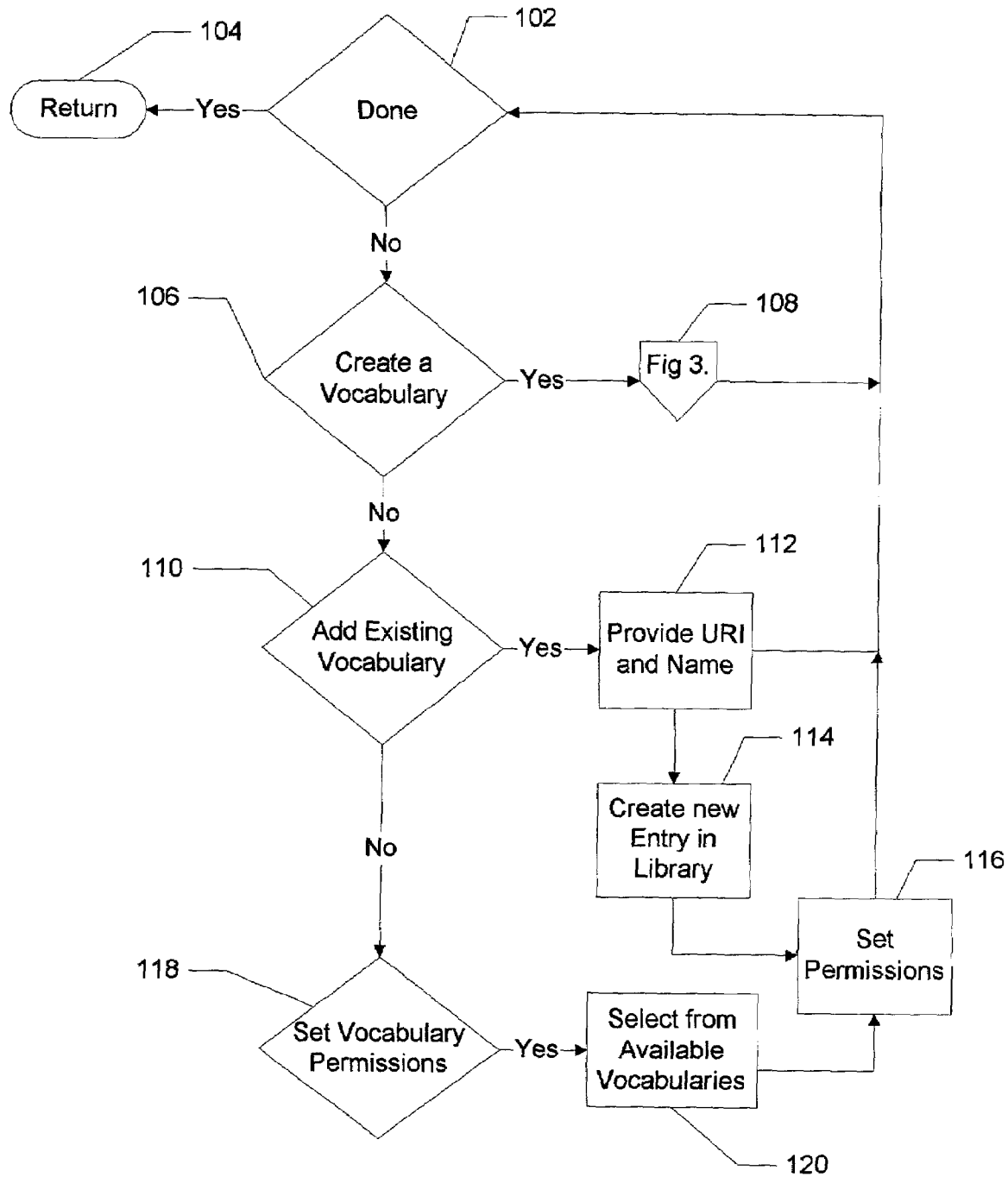
FIG. 2 is a flow chart illustrating the process of allowing users of the metadata management system to manage the metadata library.

FIG. 2 is a flow chart illustrating the process of allowing users of the metadata management system to manage the metadata library 52. Once the user logs-in, the Web application 50 displays one or more web pages that allows the user 18 to perform the following high-level functions. One management function is to allow the user to create vocabularies 84 to be added to the library 52 in step 106 (described further in FIG. 3).

The second management function is to allow the user 18 to add references to metadata vocabularies existing elsewhere on the web to the library 52 in step 110 so they may be found by the search facilities provided by the Web application 50. To add a reference to a metadata vocabulary existing external to the metadata library 52, user 18 enters the name and URI for the metadata vocabulary in one of the user interface forms in step 112, and clicks a link or button to create a new entry in the metadata library 52 in step 114. See www.w3.org/RDF/ for details of how a vocabulary can reference elements of another vocabulary in order to borrow from it.

The third management function is to allow the user 18 to set access permissions for the metadata vocabularies 84 in the metadata library 52 in step 118. This is accomplished by selecting one or more metadata vocabularies 84 from the vocabulary library 52 in step 120 and setting the user permissions of the selected metadata vocabularies 84 in step 116.

Figure 3:
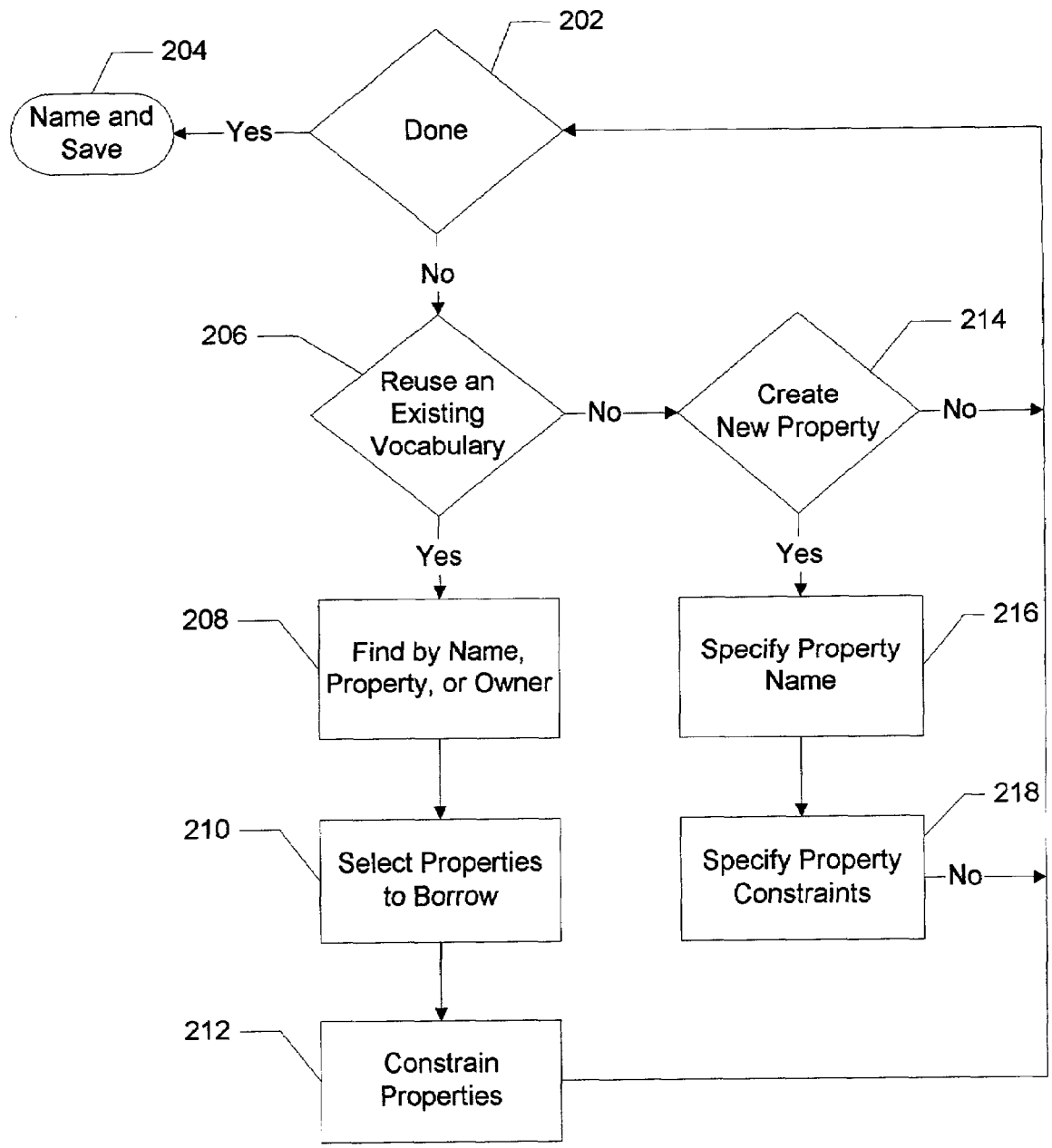
FIG. 3 is a flow chart illustrating the process of adding a new metadata vocabulary to the metadata library.

FIG. 3 is a flow chart illustrating the process of adding a new metadata vocabulary 84 to the metadata library 52. In response to the user 18 choosing to create a metadata vocabulary 84 in step 106 of FIG. 2, the Web application 50 gives the user 18 a choice to reuse properties from an existing vocabulary in step 206 or create a new property in step 214. The user 18 may create new properties to be contained in the vocabulary by entering the property name and specifying the constraints, if any, for the possible values the property may contain in step 216 and 218.

For each new property the user 18 creates, the Web application 50 prompts the user 18 for the name of the property and allows the user 18 to select from a list of property types String, List, Boolean, Numeric, etc. The choices are limited to what the underlying specification language supports. Depending on the type, the Web application 50 may prompt the user 18 to provide additional constraints, such as the list of possible values for a list type or a range for a numeric range.

If the user 18 chooses to reuse an existing vocabulary 84, then a search facilities is presented in step 208 that allows the user 18 to locate existing vocabularies 84 based on user supplied criteria, such as the vocabulary identifier (i.e., its URI), the vocabulary's name, the name(s) of properties contained in the vocabulary, the owner of the vocabulary, or the intended target types of a vocabulary. That is, the library 52 supports metadata about the metadata vocabularies 84. The search facility makes the vocabularies 84 easily browsable. The system 10 may at the option of the user 18 extend its search to include other metadata libraries (aka registries) as more of these libraries appear on the web.

After the user enters search terms and finds existing vocabularies, the user 18 may select one or more properties from these vocabularies 84 in step 210 to add to the metadata vocabulary 84 being created. The user may optionally add additional constraints to the borrowed property (as allowed by RDF) in step 212.

As an example of reusing properties from an existing vocabulary and searching, consider a user who wants to create a metadata vocabulary 84 for describing pictures of his pets. He may begin by borrowing properties from the well-known Dublin Core metadata vocabulary, such as Title, Subject, and Description. He would do this by locating the Dublin core vocabulary using the search facility. In the search facility, he can enter the ID of the Dublin Core (i.e., its URI) or enter the names of one or more properties in the Dublin Core such as "subject". Once the Dublin Core vocabulary is located and selected, the Web application 50 would display the properties available from the vocabulary allowing the user to select which elements to borrow. The user 18 may repeat this borrowing process from other vocabularies 84. As the user 18 borrows properties, the Web application 50 allows the user to specify additional constraints. For example, the "Subject" property in the Dublin Core is a string (typically a string of keywords). The user 18 could select to restrict the string to one or more of a series of words from a list he specifies. When subsequently applying his custom metadata to images of his pets, the Web application 50 would display the list of pet names for the user to select from.

As an additional option, the user 18 may supply a validator 24 to enforce constraints beyond those supported by the specification language. The validator 24 is a software program that supports a plugin API provided by the metadata library 52. The validator 24 is called when metadata associated with the vocabulary is created or changed, but after the constraints enforced by the specification language have been verified.

The processes of reusing existing vocabularies 84 and creating new properties may be repeated as needed until the user 18 is satisfied with the new metadata vocabulary 84 in step 202. When the new metadata vocabulary 84 is complete, the metadata vocabulary 84 is named and saved in the metadata library 52 in step 204.

Figure 4:
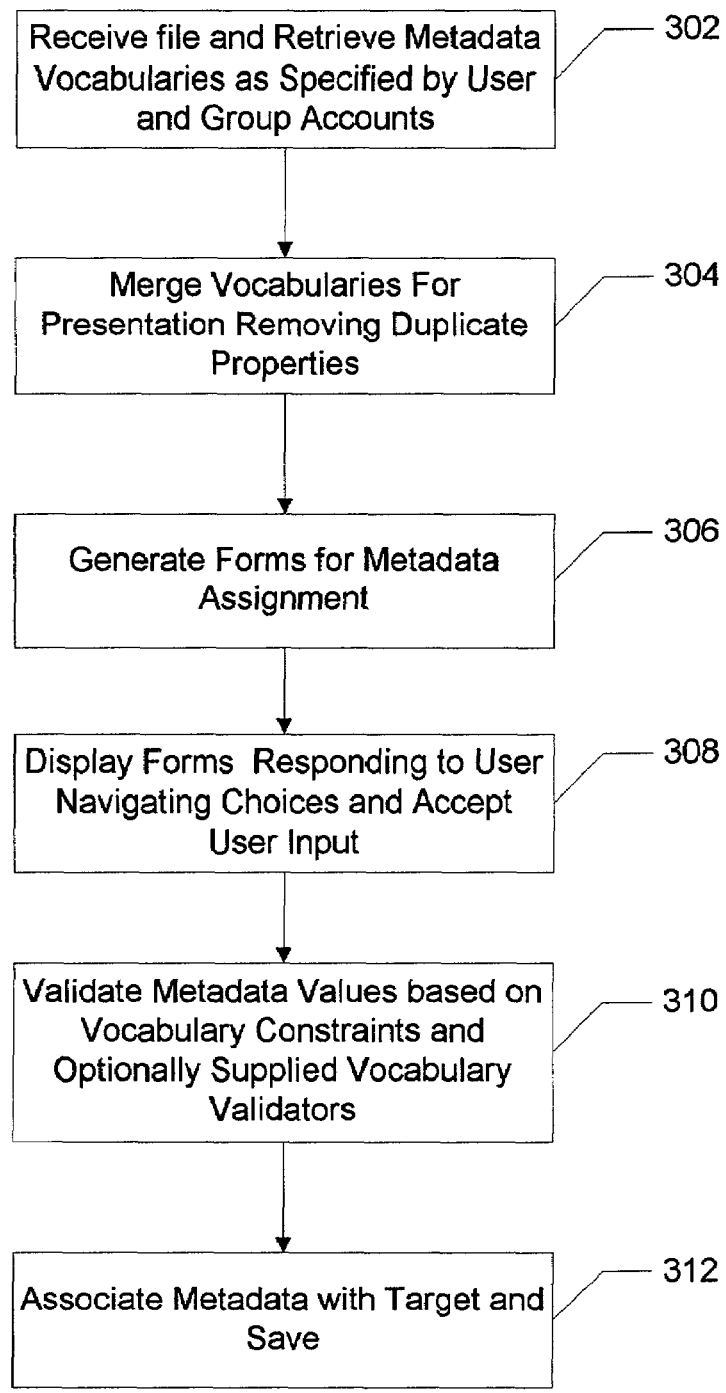
FIG. 4 is a flow chart illustrating the process of assigning metadata from the vocabulary library to a target resource.

FIG. 4 is a flow chart illustrating the process of assigning required metadata from the vocabulary library to a target resource. When the Web application 50 receives a target resource to be added to the photosharing site 12 from the user 18, the Web application 50 checks the user's account and the relevant group accounts that the user is a member of and retrieves the required vocabularies 84 specified for the type of target resource in step 302. As stated above, any resource type may be supported, including images, sound files, movies, text files, and so on).

Because the metadata vocabularies 84 often borrow properties from one another, the Web application 50 merges the required metadata vocabularies 84 retrieved from the library 52 in step 304 before prompting the user to enter values for the properties. The merging process performs two primary functions. First, it removes duplicate properties (that result from the borrowing of properties among vocabularies 84). Second, because the same property may have different sets of constraints specified by different vocabularies 84, the Web application 50 ensures that policy for conflicting constraints is enforced. In a preferred embodiment, the most restrictive constraints are applied. In an alternate embodiment, the Web application 50 may allow the user to enter values that meet either constraint. A third possibility for constraint policy is to always choose the constraints in one particular vocabulary 84 over another. For example, two required vocabularies 84 may both borrow the property "subject" from the Dublin Core. Each of these vocabularies 84 may have specified additional constraints on what the value of "subject" may be.

After merging vocabularies 84, the Web application 50 builds the user interface by generating forms for metadata assignment in step 306 through which the user may enter values for the assigned metadata. In a preferred embodiment, the interface is a series of one or more forms displayed in the web browser 19. In a preferred embodiment, XSLT is used to transform the RDF schema specification into XHTML forms for display in the user's web browser 19. The user 18 is then allowed to navigate through the form(s) entering data in step 308. The forms may display additional comments provided by the vocabularies 84 to aid the user 18 in entering the data values. As the user moves to an input field for a given property, the Web application 50 uses the constraints defined for the property to determine the correct form element to use for data input for any given property (a test field, a selection list, a choice list, and so on).

As the user 18 enters values for the metadata, the Web application 50 validates the metadata values based on the vocabulary constraints and optionally supplied vocabulary validator 24(s) in step 310. When the data is valid and the user 18 is finished entering metadata values, the Web application 50 associates the metadata with the target resource and saves in step 312.

Figure 5:
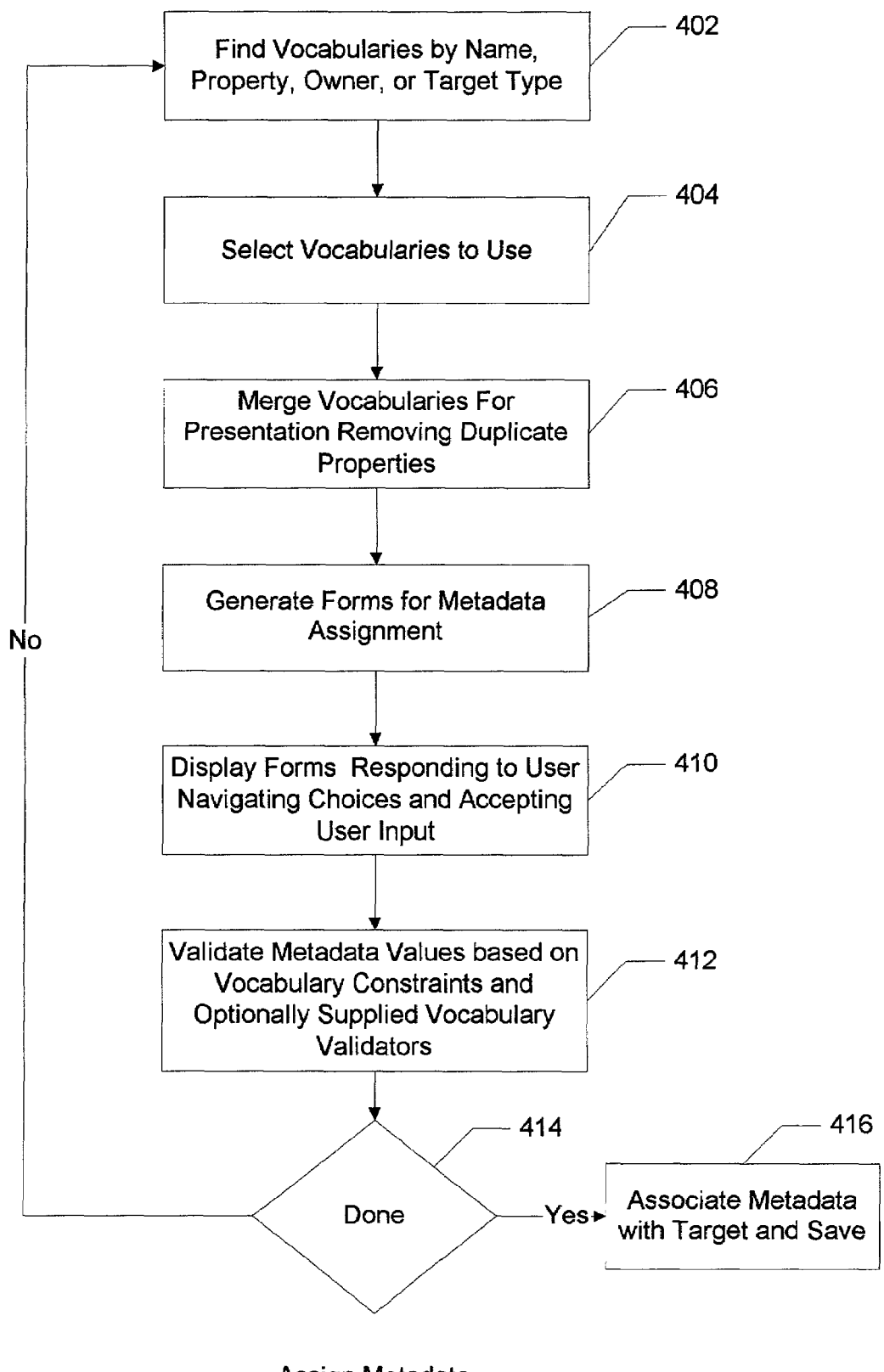
FIG. 5 illustrates the process of allowing the user to associate optional metadata with a target resource that already exists in the photosharing site.

FIG. 5 illustrates the process of allowing the user 18 to associate optional metadata with a target resource that already exists in the management site 12. In other words, this process allows the user 18 to add metadata for the target resource that was not otherwise required for that resource type. In a preferred embodiment, the user 18 may add metadata to any target to which he/she has access. The user 18 first searches and/or browses for metadata vocabularies 84 as needed to add the desired metadata to the target in step 402. The user 18 then selects vocabularies 84 to use in step 404. Note: If the user 18 can't find the needed properties in existing vocabularies 84 the user 18 can create a new one, as described with reference to FIG. 3.

After the user has selected vocabularies to use, the process proceeds as described with reference to FIG. 4: merging the vocabularies (step 406), generating forms for metadata assignment (step 408), displaying the forms and accepting user input (step 410), and validating the metadata values based on the vocabulary constraints and optional vocabulary validator 24s (step 412). The user 18 may continue by searching for more vocabularies to add to the target resource in step 402. When user 18 is done in step 414, the metadata is associated with the target resource and saved in step 416.

As an example of adding optional metadata to images consider the following example. Assume that the user 18 has added an image of a family with mountains in the background to the system 10. Assume further that the user 18 has defined a private schema that includes the universal schema, borrows from a shared schema defined for family metadata, and has added additional metadata for the user's 18 private use. Another user 18 may discover the image, perhaps through a search using fields in the universal schema. Seeing the mountains in the picture and being an avid fan of nature photography this user creates nature metadata to associate with image using a shared schema defined for nature photographs. The user then uploads this metadata for the image to the server 14. Other users constructing searches built using one or more of these vocabularies (universal, family, user's private extensions, and nature) will be able to find image if the search criteria match.

According to the present invention, the photosharing system allows users to create custom metadata and to make the custom metadata available for other users in the system to use. The schema definitions are not limited by the system 10. Further, the system allows the users to add and reuse the metadata stored in the system without requiring users to know underlying details regarding the schema language and syntax.

A method and system for specifying, assigning, and maintaining user defined metadata in a network-based metadata management system has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for allowing a user to define custom metadata schemas, the method comprising the steps of:
   (a) providing a network accessible server with a metadata library comprising a plurality of metadata schemas;
   (b) providing information to a client computer for presenting a form-driven user interface that allows the user to specify, without using syntax required by an underlying specification language, a plurality of properties, including constraints supported by the underlying specification language, to thereby define a custom metadata schema;
   (c) storing the custom metadata schema in the metadata library; and
   (d) allowing the user to search the metadata library to select at least one of the metadata schemas to apply to a resource.

2. The method of claim 1 wherein step (a) further includes the step of:
   (i) providing the server with management capabilities that allows a user to define metadata schemas, add references to the library to metadata schemas existing external to the metadata library, and set user permissions for the metadata schemas in the library.

3. The method of claim 2 wherein step (a)(i) further includes the step of: adding references to external metadata schemas by providing a universal resource indicator and name of the metadata schema.

4. The method of claim 1 wherein step (b) further includes the step of:
   (i) allowing the user to define the custom metadata schema from one of the plurality of metadata schemas.

5. The method of claim 4 wherein step (b)(i) further includes the step of:
   (1) allowing the user to search for one of the plurality of metadata schemas by entering search criteria that include schema names and property names;
   (2) displaying metadata schemas matching the search criteria; and
   (3) allowing the user to select properties from the displayed metadata schemas to add to the custom metadata schema.

6. The method of claim 1 further including the step of: allowing the user to supply a software validator to enforce constraints beyond the constraints supported by an underlying specification language, wherein the software validator is called when metadata associated with the schema is created or changed, but after constraints enforced by the specification language have been verified.

7. The method of claim 1 wherein step (d) further includes the step of:
   allowing the user to upload the resource to the server.

8. The method of claim 7 wherein step (a) further includes the step of: including in the metadata library a universal schema, shared schemas, and private schemas.

9. The method of claim 8 wherein step (a) further includes the step of:
   requiring all images in the network to include metadata that is specified by the universal schema.

10. The method of claim 1 wherein step (d) further includes the step of:
    allowing the user to specify which metadata schemas are associated with particular resource types.

11. The method of claim 10 wherein step (d) further includes the step of:
    (i) associating user account information with the resource type and required metadata schema information; and
    (ii) automatically applying required metadata schemas specified for the type of resource when the server receives the resource by checking the user's account and retrieving the required metadata schemas specified for the resource type.

12. The method of claim 1 further including the steps of allowing the user to assign a metadata instance to the resource by:
    retrieving metadata schemas specified for a resource type of the resource;
    merging the retrieved metadata schemas and removing duplicate properties;
    generating and displaying forms that allow the user to enter data values for the properties;
    validating the data values based on schema constraints; and
    associating the data values with the resource and saving.

13. A computer-readable storage medium containing program instructions for allowing a user to define custom metadata schemas, the instructions for:
    (a) providing a network accessible server with a metadata library comprising a plurality of metadata schemas;
    (b) providing information to a client computer for presenting a form-driven user interface that allows the user to specify, without using syntax required by an underlying specification language, a plurality of properties, including constraints supported by the underlying specification language, to thereby define a custom metadata schema;
    (c) storing the custom metadata schema in the metadata library; and
    (d) allowing the user to search the metadata library to select at least one of the metadata schemas to apply to an electronic resource.

14. The computer-readable medium of claim 13 wherein instruction (a) further includes the instruction of:
    (i) providing the server with management capabilities that allows a user to define metadata schemas, add references to the library to metadata schemas existing external to the metadata library, and set user permissions for the metadata schemas in the library.

15. The method of claim 1 further including the steps of allowing the user to assign a metadata instance to the resource by:
    retrieving metadata schemas specified for resource type of the resource;
    merging the retrieved metadata schemas and removing duplicate properties;
    generating and displaying forms that allow the user to enter data values for the properties;
    validating the data values based on schema constraints; and
    associating the data values with the resource and saving.

16. The computer-readable medium of claim 13 wherein instruction (b) further includes the instruction of:
    (i) allowing the user to define the custom metadata schema from one of the plurality of metadata schemas.

17. The computer-readable medium of claim 16 wherein instruction (b)(i) further includes the instruction of:
    (1) allowing the user to search for one of the plurality of metadata schemas by entering search criteria that include schema names and property names;
    (2) displaying metadata schemas matching the search criteria; and
    (3) allowing the user to select properties from the displayed metadata schemas to add to the custom metadata schema.

18. The computer-readable medium of claim 13 further includes the instruction of:

allowing the user to supply a software validator to enforce constraints beyond the constraints supported by the underlying specification language, wherein the software validator is called when metadata associated with the schema is created or changed, but after constraints enforced by the specification language have been verified.

19. The computer-readable medium of claim 13 wherein instruction (d) further includes the instruction of: allowing the user to upload the resource to the server.

20. The computer-readable medium of claim 13 wherein instruction (d) further includes the instruction of: allowing the user to specify which metadata schemas are associated with particular resource types.

21. The computer-readable medium of claim 20 wherein instruction (d) further includes the instruction of:
(i) associating user account information with the resource type and required metadata schema information; and
(ii) automatically applying required metadata schemas specified for the type of resource when the server receives the resource by checking the user's account and retrieving the required metadata schemas specified for the resource type.

22. The computer-readable medium of claim 21 wherein instruction (a) further includes the instruction of: including in the metadata library a universal schema, shared schemas, and private schemas.

23. The computer-readable medium of claim 22 wherein instruction (a) further includes the instruction of: requiring all images in the network to include metadata that is specified by the universal schema.

24. The computer-readable medium of claim 13 further including the instructions of allowing the user to assign a metadata instance to the resource by:

retrieving metadata schemas specified for the resource type of the resource; merging the retrieved metadata schemas and removing duplicate properties;
generating and displaying forms that allow the user to enter data values for the properties;
validating the data values based on schema constraints; and associating the data values with the resource and saving.

25. A metadata management system, comprising:
a server in communication over a network with a plurality of client computers each storing respective resources, the server including:
a metadata library containing a plurality of metadata schemas, each metadata schema comprising a plurality of properties and constraints on values for the properties, and
a Web application for providing information to one of the plurality of client computers for presenting a form-driven user interface that allows the user to specify, without using syntax required by an underlying specification language, a plurality of properties, including constraints supported by the underlying specification language, to thereby define a custom metadata schema for storage in the metadata library, wherein the Web application allows the user to search the metadata library to select at least one of the metadata schemas to apply to a resource.

26. The system of claim 25 wherein the web application further functions to allow the user to upload one of the resources to the server, wherein the selected metadata is applied to the resource.

27. The system of claim 25 wherein the server includes management capabilities that allows the user to define metadata schemas, add references to the library to metadata schemas existing external to the metadata library, and set user permissions for the metadata schemas in the library.

28. The system of claim 27 wherein the user adds references to external metadata schemas by providing a universal resource indicator and name of the metadata schema.

29. The system of claim 25 wherein the Web application allows the user to define the custom metadata schema from one of the plurality of metadata schemas.

30. The system of claim 29 wherein the Web application allows the user to define the custom metadata schema from one of the plurality of metadata schemas by:
allowing the user to search for one of the plurality metadata schemas by entering search criteria that include schema names and property names;
displaying metadata schemas matching the search criteria; and
allowing the user to select properties from the displayed metadata schemas to add to the custom metadata schema.

31. The system of claim 25 further including a software validator running on client appears to enforce constraints beyond the constraints supported by the underlying specification language, wherein the software validator is called when metadata associated with the schema is created or changed, but after constraints enforced by the underlying specification language have been verified.

32. The system of claim 25, wherein the user is allowed to specify which metadata schemas are associated with particular resource types.

33. The system of claim 32, wherein the Web application associates user account information with the resource type and required metadata schema information, and to the required metadata schemas specified for the type of resource are automatically applied when the server receives the resource by checking the user's account and retrieving the metadata schemas specified for the resource type.

34. The system of claim 33 wherein the metadata library includes a universal schema, shared schemas, and private schemas.

35. The system of claim 34 wherein requiring all resources stored on the server are required to include metadata that is specified by the universal schema.

36. The system of claim 25 wherein the user is allowed to assign a metadata instance to the resource by:
retrieving metadata schemas specified for said resource type of the resource;
merging the retrieved metadata schemas and removing duplicate properties;
generating and displaying forms that allow the user to enter data values for the properties;
validating the data values based on schema constraints; and
associating the validated data values with the resource and saving.

* * * * *